US008396420B2

(12) United States Patent
Kenington

(10) Patent No.: US 8,396,420 B2
(45) Date of Patent: Mar. 12, 2013

(54) ACTIVE ANTENNA SYSTEM FOR A MOBILE COMMUNICATIONS NETWORK AS WELL AS A METHOD FOR RELAYING A PLURALITY OF RADIO SIGNALS THROUGH THE ACTIVE ANTENNA SYSTEM

(75) Inventor: Peter Kenington, Chepstow (GB)

(73) Assignee: Ubidyne, Inc., Wilmington, DE (US)

( * ) Notice: Subject to any disclaimer, the term of this patent is extended or adjusted under 35 U.S.C. 154(b) by 614 days.

(21) Appl. No.: 12/650,025

(22) Filed: Dec. 30, 2009

(65) Prior Publication Data

US 2011/0159807 A1 Jun. 30, 2011

(51) Int. Cl.
*H04B 7/14* (2006.01)
*H04B 1/04* (2006.01)

(52) U.S. Cl. ................ 455/17; 455/25; 455/24; 455/18; 455/129

(58) Field of Classification Search ............... 455/562.1, 455/524, 525, 561, 17, 18, 19, 20, 24, 25, 455/129
See application file for complete search history.

(56) References Cited

U.S. PATENT DOCUMENTS

| | | | | |
|---|---|---|---|---|
| 4,656,642 | A * | 4/1987 | Apostolos et al. | 375/139 |
| 6,941,004 | B2 * | 9/2005 | Goodman et al. | 382/124 |
| 7,745,498 | B2 * | 6/2010 | Pereira et al. | 516/33 |
| 8,059,732 | B2 * | 11/2011 | Papadopoulos et al. | 375/260 |
| 2003/0108226 | A1 * | 6/2003 | Goodman et al. | 382/124 |
| 2005/0254694 | A1 * | 11/2005 | Goodman et al. | 382/124 |
| 2006/0257637 | A1 * | 11/2006 | Pereira et al. | 428/221 |
| 2008/0130769 | A1 * | 6/2008 | Papadopoulos et al. | 375/260 |
| 2008/0304590 | A1 * | 12/2008 | Sundberg et al. | 375/260 |
| 2010/0237288 | A1 * | 9/2010 | Pereira et al. | 252/363.5 |
| 2011/0159807 | A1 * | 6/2011 | Kenington | 455/17 |
| 2011/0159809 | A1 * | 6/2011 | Kenington | 455/20 |
| 2011/0169613 | A1 * | 7/2011 | Chen et al. | 340/10.4 |

* cited by examiner

*Primary Examiner* — Tilahun B Gesesse
(74) *Attorney, Agent, or Firm* — Stephen H. Eland; Dann, Dorfman, Herrell & Skillman

(57) ABSTRACT

An active antenna system and a method for relaying radio signal in the mobile communications network is disclosed. The active antenna system comprises a plurality of antenna elements for relaying radio signals at a first frequency band. The antenna elements are connected to a plurality of signal paths. A plurality of signal inputs for inputting radio signals at a second frequency band is connected to the signal paths. A plurality of first mixers in the signal paths converts the frequency of the radio signals between the first frequency band and the second frequency band. A single first local oscillator is connected to the first mixers through a first oscillator signal path and supplies first oscillator signals to the first mixers and at least one dispersion element is connected to at least one of the signal paths.

19 Claims, 6 Drawing Sheets

ACTIVE ANTENNA SYSTEM FOR A MOBILE COMMUNICATIONS NETWORK AS WELL AS A METHOD FOR RELAYING A PLURALITY OF RADIO SIGNALS THROUGH THE ACTIVE ANTENNA SYSTEM

CROSS-REFERENCE TO RELATED APPLICATIONS

This application is related to U.S. patent application Ser. No. 12/650,021 entitled "An Active Antenna Array with a Single Common Clock and a Method for Relaying a Plurality of Radio Signals" filed on Dec. 30, 2009. The entire contents of the forgoing application is incorporated herewith.

FIELD OF THE INVENTION

The field of the invention relates to an active antenna system for a mobile communications network as well as a method for relaying a plurality of radio signals through the active antenna system.

BACKGROUND OF THE INVENTION

In a typical base station of the prior art, local oscillator signals are provided for each one of the transceivers in the base station. Likewise, in a remote radio head application, individual local oscillator signals are also provided individually for each one of the transceivers located in the remote radio head application. It is necessary to provide a multiple number of individual local oscillator signals, since each one of the transceivers may be operating on different channels. The multiple numbers of local oscillators may also be included to improve reliability through the removal of the single point of failure which a single local oscillator would provide.

One issue associated with the approach of utilizing a multiple number of individual local oscillators is the expense and real estate on a chip associated with providing a plurality of local oscillators and the possible need to calibrate the different ones of the oscillators. This can be an issue during a start-up phase. For example, if the individual local oscillators are not correctly calibrated at the start-up, this may lead to difficulties in ensuring that the required beam forming operations for the radio signals are undertaken correctly. In particular, this may mean that the correct beam shapes for the radio signal in the required directions are not correctly calculated.

FIG. 1 shows an example of an active array system 1 as known in the prior art and comprising a plurality of transmission paths. Only a first signal path 16*a* at the top, a second signal path 16*b* in the middle and a last or n'th signal path 16*n* at the bottom are illustrated in FIG. 1 (as well as in the subsequent FIGUREs). The third to the (n−1)th transmission path are not illustrated for the sake of clarity.

A radio signal 10 in the digital domain to be transmitted reaches the active antenna array 1 from the left and is fed to the digital signal processor 15. The digital signal processor 15 distributes the radio signals to be transmitted to the plurality of output paths 16*a*, 16*b*, . . . , 16*n*. In the prior art example illustrated the radio signals 10 to be transmitted by the plurality of output paths 16*a*, 16*b*, . . . , 16*n* are digital IF transmission signals which have undergone upconversion in the digital signal processor 15. Other processes may also take place in digital signal processor 15 and these include, but are not limited to, crest factor reduction, digital predistortion and digital beamforming The inclusion or omission of these processes has no impact on the teachings of the disclosure as described herein. For simplicity the letters relating to all of the paths will be left out in future reference numerals.

Only the passage of the transmission signal through the top one of the output paths 16*a* will be described in detail. It will be appreciated that all of the other output paths 16*b*, . . . , 16*n* are identical. The output path 16 is connected to a digital-analogue converter 20 which converts the digital IF transmission signals from the digital signal processor 15 to analogue signals prior to passing the analogue signals through a first filter 25 to obtain those filtered transmission signals in the desired frequency band. The filtered transmission signals in the desired frequency band are forwarded to a first mixer 30. The first mixer 30 upconverts the filtered transmission signals by means of a first local oscillator 35 to an analogue intermediate frequency band.

The output of the first mixer 30 is filtered in a second filter 40 and passed to an intermediate frequency amplifier 45 for amplification. The output of the intermediate frequency amplifier 45 is passed to a second mixer 50 at which it is upconverted with an oscillator signal from the second local oscillator 55.

The transmission signals from the first mixer 50 are now at a transmission frequency band (i. e. the radio frequency) and are passed through a third filter 60 into a radio frequency amplifier 65 before entering a transmission filter 70 and being passed to the radio frequency output 80. The radio frequency output 80 is connected to one of the plurality of antenna elements from the antenna array (not shown). A tap 75 provides a feedback loop 76 to the digital signal processor 15 through paths 85 which allow calibration and updating of the predistortion processing of the radio signals to be taken into account.

SUMMARY OF THE INVENTION

An active antenna array for mobile communications network is disclosed herein. The active antenna system comprises a plurality of antenna elements for relaying radio signals. The plurality of antenna elements is connected to a plurality of signal paths. The active antenna signal system has a plurality of signal inputs which are connected to the plurality of signal paths. At least one first mixer is present in two or more of the plurality of the signal paths which convert the frequencies of the radio signals between a first frequency band and a second frequency band. A single first local oscillator is connected to different ones of the at least one first mixer through a first oscillator signal path and supplies first oscillator signals to the at least one first mixer. At least one first dispersion element is connected to at least one of the plurality of signal paths. A setting of the at least one first dispersion element is dependent on a length of the first oscillator signal path or on a delay of the radio signals traversing the active antenna array.

The term "relaying" or "relay" in this description is intended to encompass both the transmission of radio signals and the reception of radio signals.

The use of a single reference clock enables the plurality of first local oscillators to be accurately calibrated with each other, since there is only a single reference clock. This allows additionally real estate to be saved on the chip.

In one aspect of the invention, the first dispersion elements are included either in the first oscillator signal paths or between the single first oscillator and the at least one mixer. The first dispersion elements allow a delay and/or phase of the first oscillator signal to be changed to take into account different lengths of the signal paths through the active antenna array and/or the first oscillator signal path. The degree of change is indicated by the setting of the first dispersion element. It will be noted that the setting may be further adjusted to take account of other delays or errors in various signal processing elements and paths within the active antenna array which delay the radio signals traversing the signal paths in the active antenna array (so-called phase or delay error metrics).

The active antenna array may also comprise a plurality of second mixers which are connected to the output of the plurality of first mixers and which convert the frequency of the radio signals between the second frequency band, for example an intermediate frequency, and a third frequency band, for example the radio frequency. The plurality of second mixers is connected to a plurality of second oscillators which are clocked by the single reference clock through a plurality of second oscillator signal paths. The plurality of second mixers enable a two-stage conversion of the frequency of the radio signals.

A method for a transmission of a plurality of radio signals is also disclosed. This method comprises inputting a plurality of radio signals at a first frequency band, for example a base band, generating a plurality of first oscillator signals from a single first oscillator and converting the plurality of the radio signals from the first frequency band to a second frequency band using first mixers supplied by the plurality of first oscillator signals. The dispersion of at least one of the plurality of first oscillator signals or the plurality of radio signals is adjusted based primarily on a length of a first oscillator signal path between one of the first mixers and the remainder of the plurality of first mixers, but may also be adjusted to take account of other delays or errors in various signal processing elements and paths within the active antenna array (as discussed above).

The method may also comprise generating a plurality of second clock signals from the signal reference clock signal and converting the plurality of radio signals from the second frequency band to a third frequency band using the plurality of second clock signals. In one aspect of the invention the one or more of the plurality of single clock signals can be delayed using dispersion elements.

A chip set for use in the antenna system is also disclosed. The chip set comprises a plurality of signal inputs for inputting the radio signals and being connected to the plurality of signal paths. At least one first mixer is present in two or more of the plurality of the signal paths which convert the frequencies of the radio signals between a first frequency band and a second frequency band. A single first local oscillator is connected to different ones of the at least one first mixer through a first oscillator signal path and supplies first oscillator signals to the at least one first mixer. At least one first dispersion element is connected to at least one of the plurality of signal paths. A setting of the at least one first dispersion element is dependent on a length of the first oscillator signal path.

A computer program provides comprising a computer-useable medium having control logic stored in the computer-useable medium is also disclosed. The control logic is able to code a computer and associated manufacturing apparatus to manufacture an active antenna array for the mobile communications network. The active antenna array comprises a plurality of antenna elements for relaying radio signals, wherein the plurality of antenna elements are connected to a plurality of signal paths. At least one first mixer is present in two or more of the plurality of the signal paths which convert the frequencies of the radio signals between a first frequency band and a second frequency band. A single first local oscillator is connected to different ones of the at least one first mixer through a first oscillator signal path and supplies first oscillator signals to the at least one first mixer. At least one first dispersion element is connected to at least one of the plurality of signal paths. A setting of the at least one first dispersion element is dependent on a length of the first oscillator signal path or on other phase or delay error metrics.

A computer program product comprising a computer-useable medium having control logic for causing an active antenna array to execute a method for relaying a plurality of radio signals is also disclosed. The computer program product has first computer readable code means for inputting a plurality of radio signals at a first frequency band and second computer readable code means for generating a plurality of first oscillator signals from a single first oscillator. The computer program product further comprises third computer readable code means for converting the plurality of radio signals from the first frequency band to a second frequency band using the plurality of the first oscillator signals and fourth computer readable code means for adjusting the dispersion of at least one of the plurality of first oscillator signals or the plurality of radio signals based on a length of a first signal oscillator signal path between one of the first mixers and the remainder of the first mixers or other phase or delay error metrics within the active antenna array (as discussed above).

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect can be combined with a feature of a different aspect or aspects.

Figure 1:
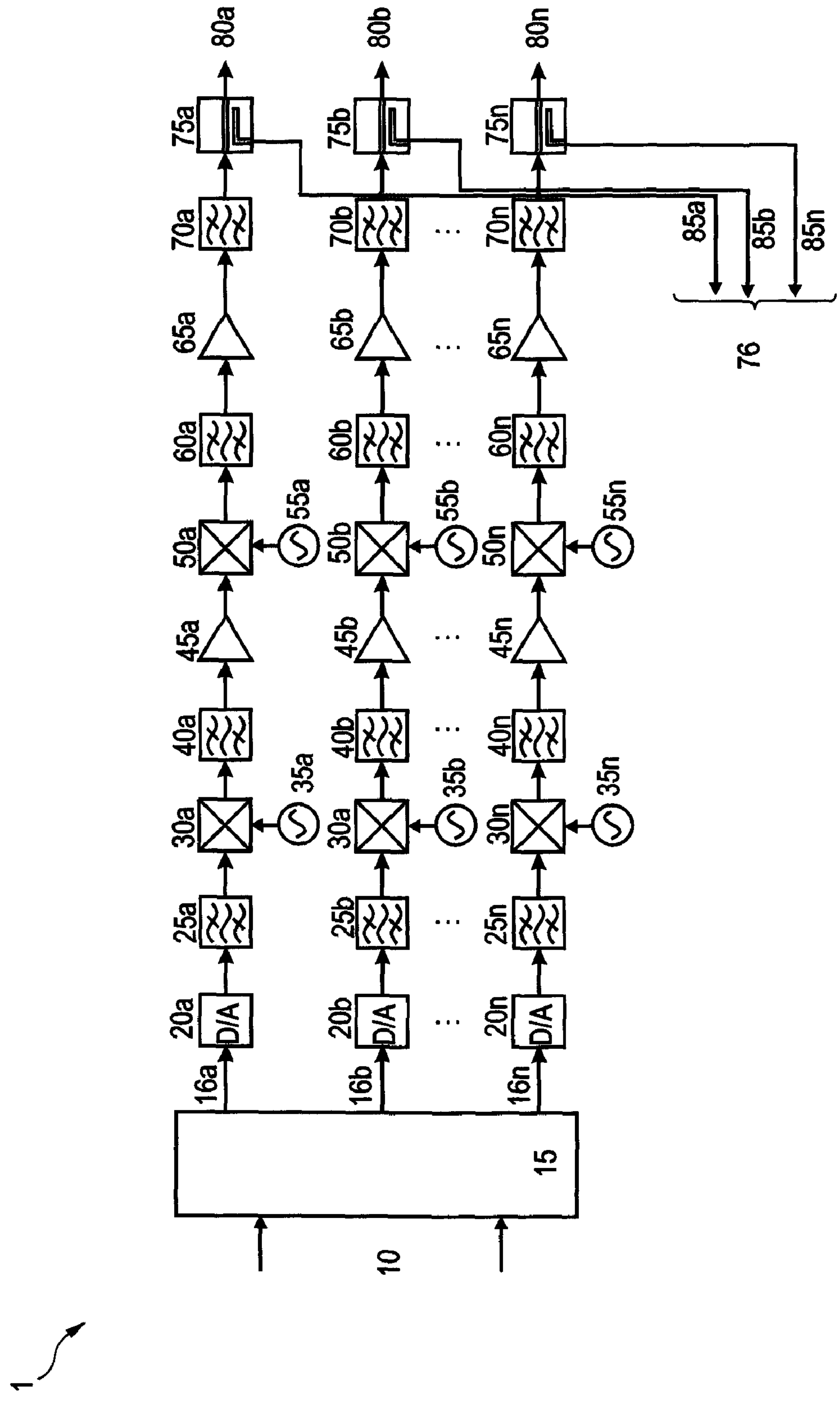
Fig.1 Prior Art
FIG. 1 shows a prior art antenna array for mobile communications network.
Figure 2:
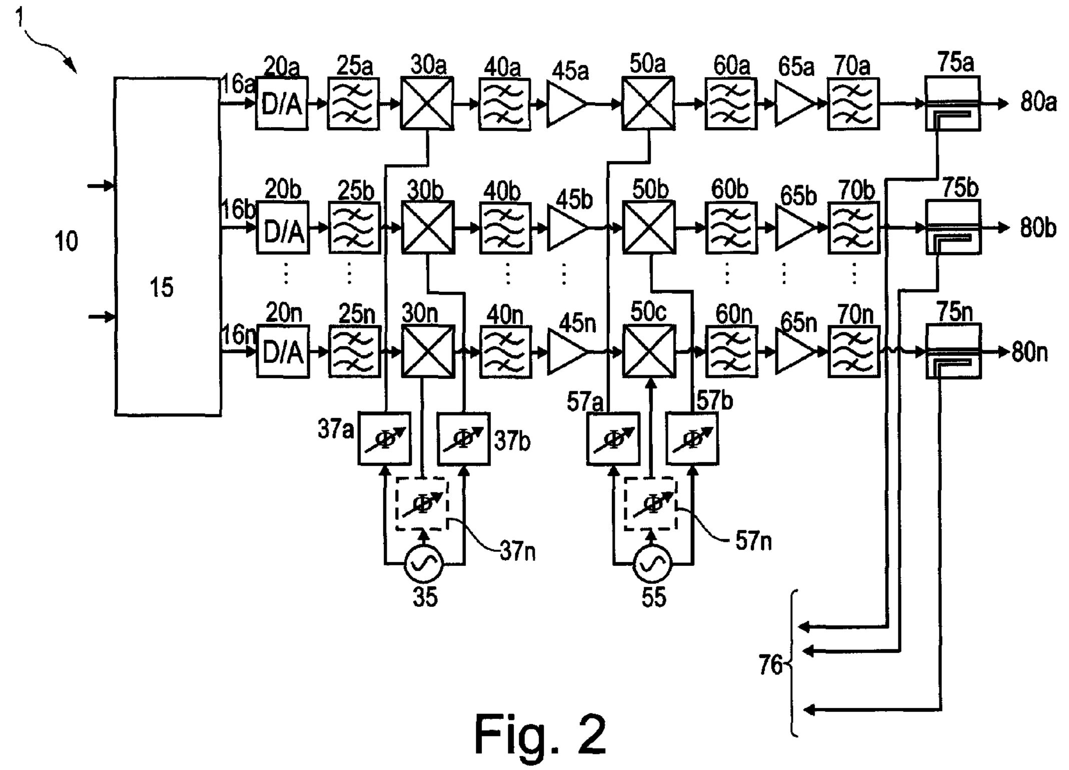
FIG. 2 shows an active antenna array employing common clocks for all of the local oscillators.

FIG. 2 shows a first aspect of the invention. It will be appreciated that many of the elements in FIG. 2 are identical with the elements in FIG. 1 and have been allocated the same reference numerals. This disclosure outlines in detail aspects of the disclosure relating to the transmission of radio signals. Modifications of the circuit depicted in FIG. 2 and the other Figures required for the reception of radio signals will be disclosed later.

The aspect of the invention shown in FIG. 2 differs from the prior art method in FIG. 1 in that a single first oscillator 35 and a single second local oscillator 55 is connected to the plurality of first mixers 30*a*, 30*b*, . . . , 30*n* and to the plurality of second mixers 50*a*, 50*b*, . . . , 50*n* through first dispersion elements 37*a*, 37*b*, . . . , 37 or second dispersion elements 57*a*, 57*b*, . . . , 57*n*. One of the first dispersion elements 37*n* and one of the second dispersion elements 37*n* is shown in FIG. 2 as a dotted line. This dotted line indicates that the one of the first dispersion elements 37*n* connected to the signal paths 16*n* is not in fact required. It is only necessary that the first oscillator signals from the single first oscillator reach the first mixers 30*a*, 30*b*, . . . , 30*n* at a time which enables the upconversion of the radio signals to occur in tandem with each other.

Figure 3:
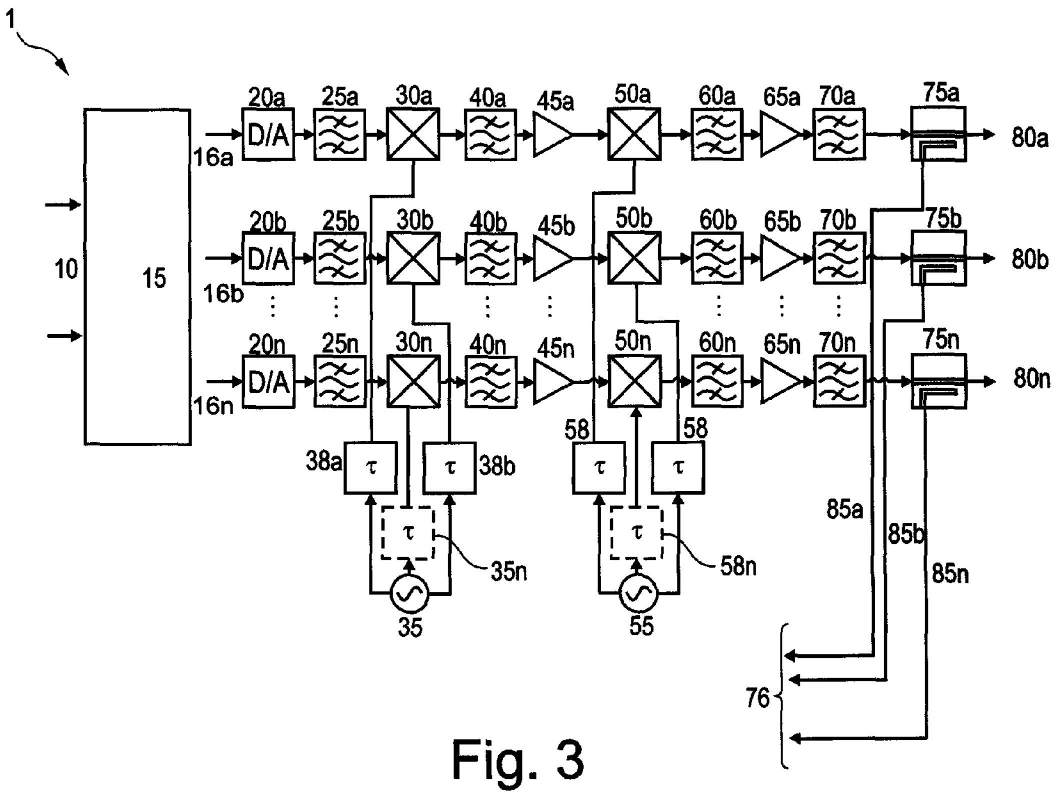
FIG. 3 shows an active antenna array employing common clocks with phase compensation.

The first dispersion elements 37*a*, 37*b*, . . . , 37*n* are either phase shifters (as shown in FIG. 2), or delay elements (see FIG. 3 reference numeral 38*a*, 38*b*, . . . , 38*n*). The first dispersion elements 37*a*, 37*b*, . . . , 37*n* need to delay the time of arrival of the first oscillator signals with respect to one of the first mixers—in this case the first mixer 37*n*. The single first oscillator 35 is used in the active antenna array 1, rather than a plurality of first local oscillators 35*a*, 35*b*, . . . , 35*n* for each one of the signal paths 16 used in the prior art antenna array as shown in FIG. 1. Similarly the single second oscillator 55 is used instead of the plurality of second local oscillators 55*a*, 55*b*, . . . , 55*n* of the prior art antenna array of FIG. 1.

Similarly one of the second dispersion elements (e.g. 57*n*) can also be eliminated as a second oscillator signal from the single second oscillator needs to be delayed for all but one of the second mixers 50*a*, 50*b*, . . . , 50*n*.

FIG. 3 shows a second aspect of the invention in which the first dispersion elements 38*a*, 38*b*, . . . , 38*n* and the second dispersion elements 58*a*, 58*b*, . . . , 58*n* are shown here as delay elements (as noted above).

The function of the first dispersion elements 37 and 38 in FIGS. 2 and 3 is to take into account that the length of the paths, or the delay experienced by a signal traversing one of the paths, of the radio signals through the complete radio signal paths may vary slightly between different ones of the radio signal paths. The dispersion elements 37, 38, 57, 58 can therefore slightly change the time of arrival of the local oscillator signals supplied to the first mixers 30 and the second mixers 50 in order to take this change of path length into account.

Figure 4:
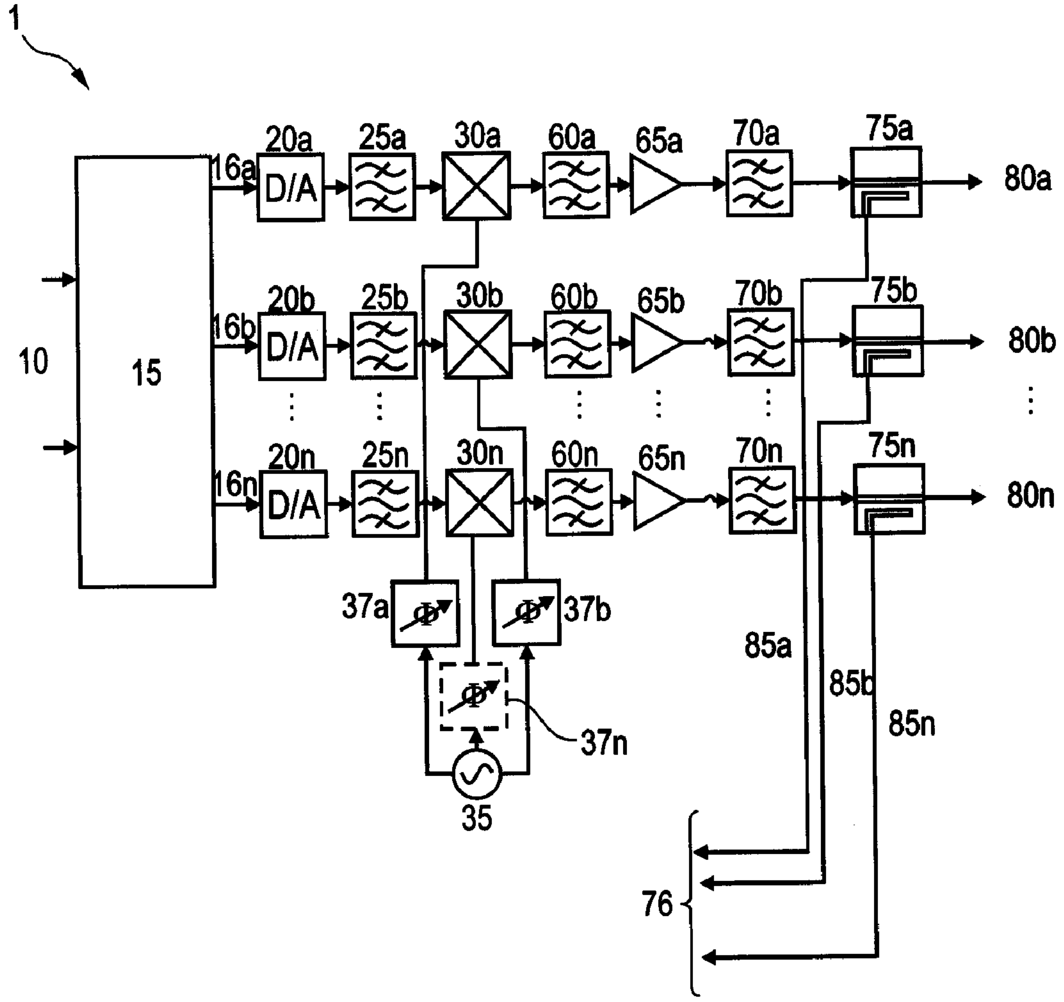
FIG. 4 shows an active antenna array with a single upconversion system.

FIG. 4 shows an aspect of the invention in which there is a single upconversion system. In this aspect of the invention the radio signals 10 are converted to analogue signals by the first digital to analogue convertor 20 and than upconverted to the transmissions signal by the plurality of first mixers 30. There are no second mixers present in this aspect of the invention. Similarly there is only a single local oscillator 35 which is connected to the plurality of first mixers 30 through the dispersion elements 37 (here shown as a phase shifter, but also potentially a delay element).

Figure 5:
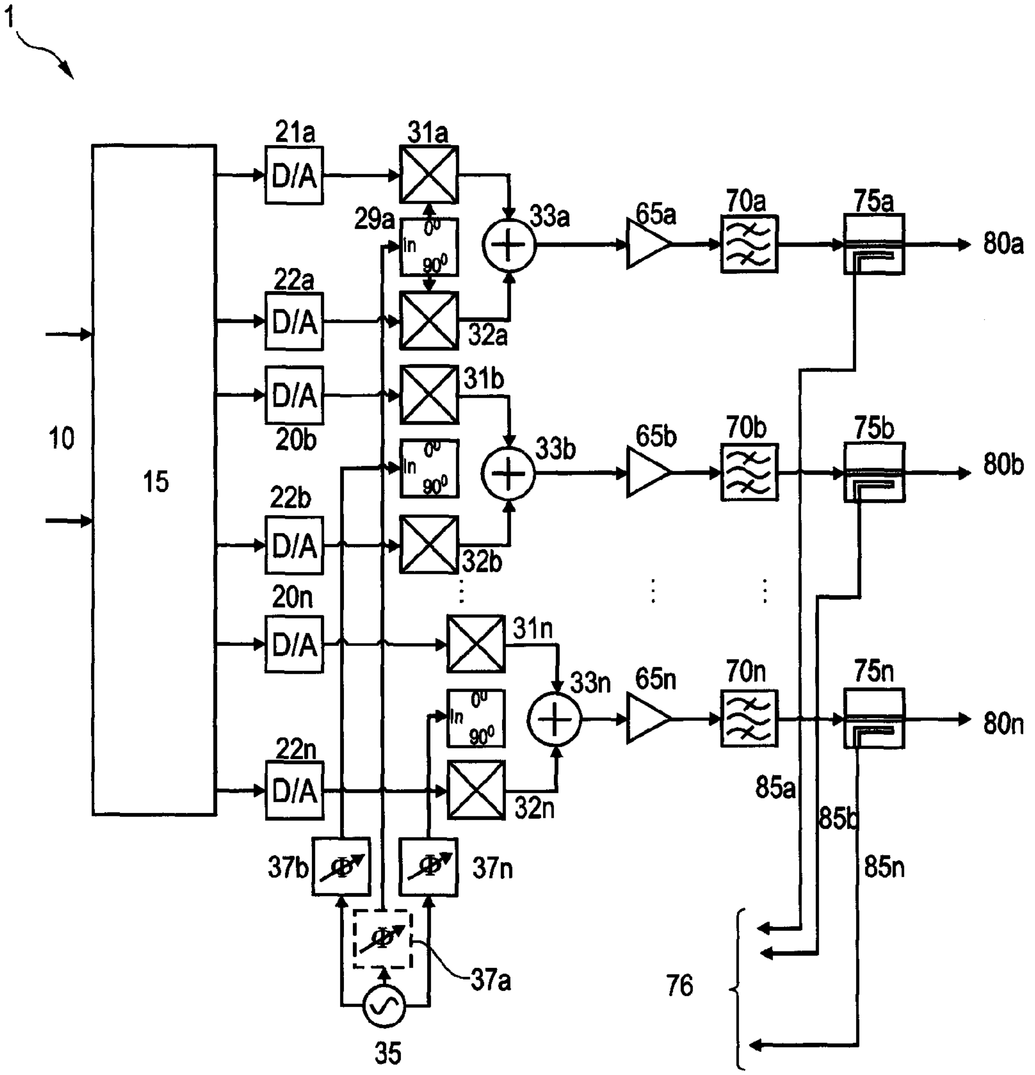
FIG. 5 shows another aspect of the active antenna array with a single upconversion system.

FIG. 5 shows a further aspect of the active antenna array in which the radio signals are output from the digital signal processor 15 as an I-component and a Q-component. A plurality of third digital to analogue convertors 21 is connected between the digital signal processor 15 and a plurality of third mixers 31 to digitally to analogue convert the I-component of the digital signals to an analogue signal. The analogue signal is then upconverted in the plurality of third mixers 31.

Similarly the Q-components are converted in a fourth digital to analogue convertor 22 and upconverted in the plurality of fourth mixers 32. A local oscillator signal is supplied through the first oscillator signal path and a plurality of first dispersion elements 37*a*, 37*b*, . . . , 37*n* from the first local oscillator 35 to a plurality of phase change elements 29. The plurality of phase change elements 29 are connected to the plurality of third mixers 31 and the plurality of fourth mixers 32 to supply a local oscillator signal to each one the third mixers 31 and with a phase difference of 90° to the fourth mixers 32. The outputs of the third mixers 31 and the outputs of the fourth mixers 32 are passed to a plurality of combiners 33 and sent to a plurality of amplifiers 65.

Figure 6:
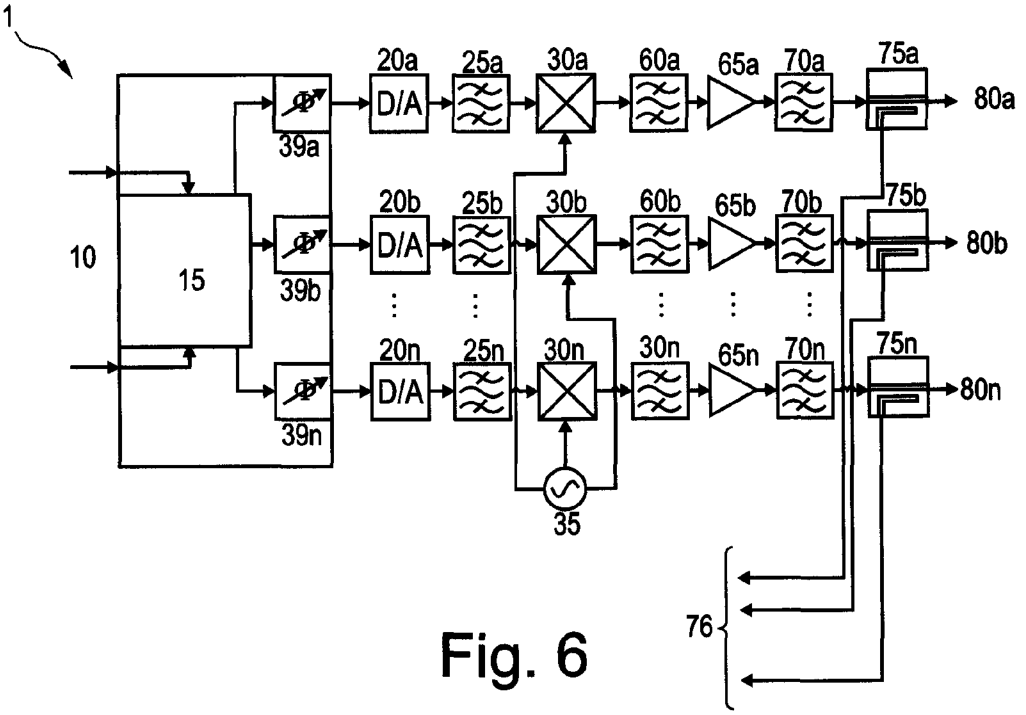
FIG. 6 shows an active antenna array with digital dispersion.
Figure 7:
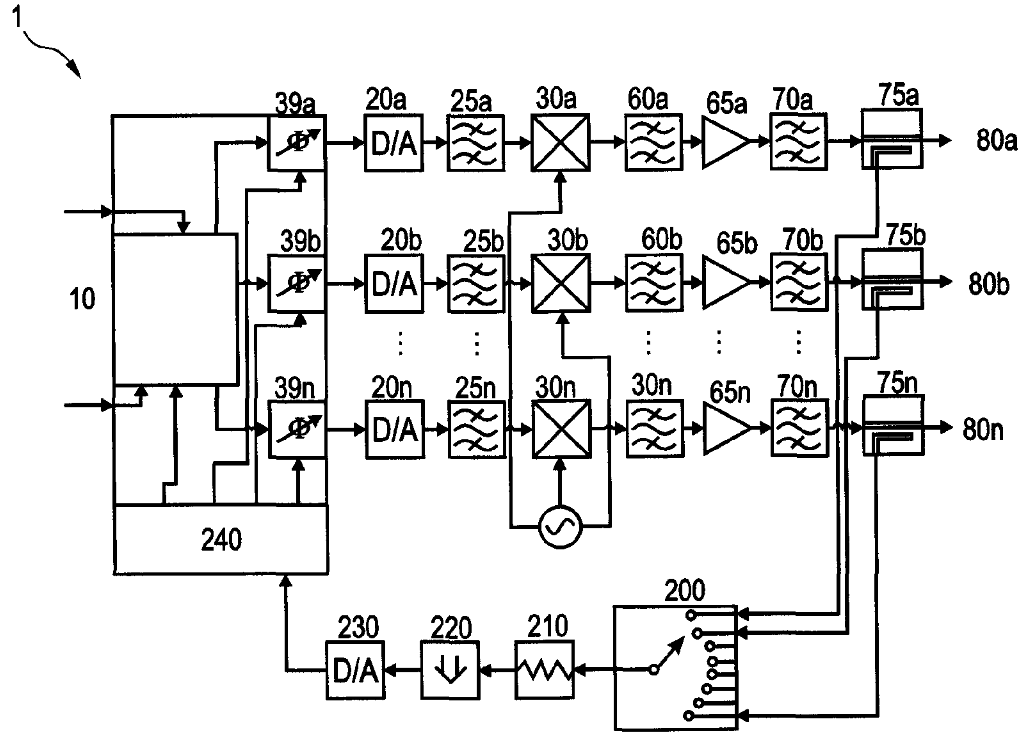
FIG. 7 shows an active antenna array with a feedback compensation.

In FIG. 6 a further aspect of the invention is shown in which digital dispersion elements 39 are in the digital domain and located between the digital signal processor 15 and the plurality of first digital to analogue convertors 20. It will be appreciated that the settings for the plurality of digital dispersion elements 39 can be supplied through the feedback loop 70 as it is illustrated in more detail in FIG. 7 which further includes a switch 200 for switching between the individual ones of the taps 75. The signals from the plurality of taps 75 are passed through an attenuator 210 and then downconverted in element 220 before being converted into an analogue signal by means of the analogue to digital convertor 230. The output of the analogue to digital convertor 230 is passed to a processing element 240 which changes settings of the digital dispersion elements 39. The feedback loop 76 allows a dynamic change in the settings of the digital dispersion elements 39 to take into account, for example temperature fluctuations.

Figure 8:
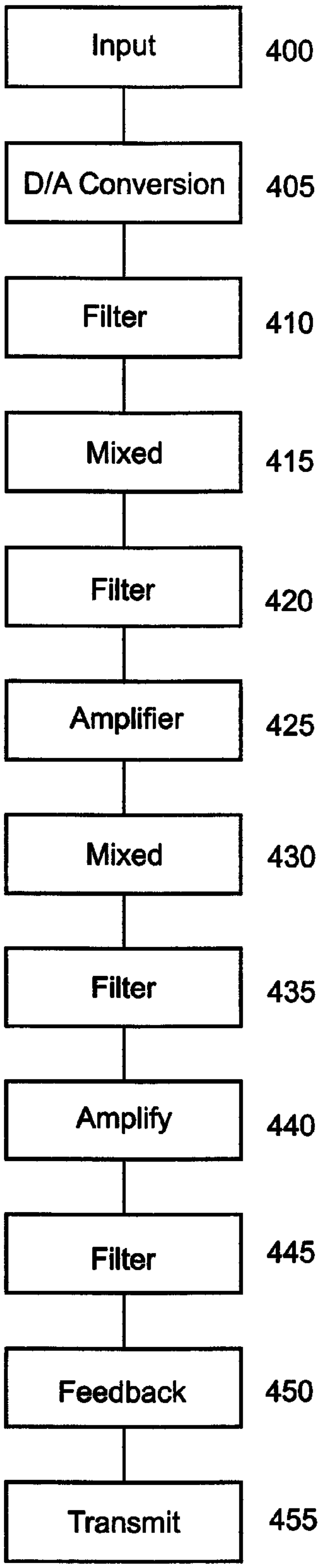
FIG. 8 shows an exemplary method for the operation of the active antenna array.

FIG. 8 shows a method for relaying the plurality of radio signals according to the disclosure. In FIG. 8 in step 400 the digital transmission signals are input into the digital signal processor 15 where beam forming operations are carried out on the transmission signals. The manipulated digital transmission signals are output over the signal paths 16 to the digital to analogue convertor 20 in step 405 at which point the manipulated digital transmission signals are converted to analogue signals and in step 410 the analogue signals are filtered to remove out-of-band frequencies. In step 415 the analogue radio signals from the first filter 25 are upconverted with the first local oscillator signal supplied by the single first local oscillator 35 through the first dispersion elements 37 or 38. This generates analogue signals at an intermediate frequency. The individual radio signals at the intermediate frequency band are filtered in the second filter 40 to remove out-of-band signals and than amplified in an intermediate frequency amplifier 45 before being passed to a second mixer 50, where they are modulated with the second oscillator signal in step 430. The second mixer 55 receives the second oscillator signal from the second oscillator 55 through the second dispersion elements 57 or 58.

In step 435 out-of-band frequencies from the individual radio signals from the second mixer 55 are filtered in the third filter 60 before the individual radio signals at the radio frequency are amplified once again in the second amplifier 65 in step 440. In step 445 out-of-band frequencies are filtered out of the individual radio signals in the fourth filter 70. A feedback signal is generated in step 450 which is supplied to calibration and pre-distortion feedback elements (for example the processing element 240). The feedback signal can be used to change settings in one or more of the first dispersion elements 37 or 38 and the second dispersion elements 57 or 58. Finally in step 455 the individual radio signals are transmitted through individual ones of the antenna array elements 80.

The active antenna array 1 of the current disclosure has been described with respect to the transmission of radio signals from the base station. It will, however, be appreciated that the provision of the single first oscillator 35 and/or the single second oscillator 55 in the active antenna array 1 can also be used for the reception of individual radio signals at the radio frequency through the plurality of antenna array elements 80 and downconversion to the base band frequency.

In this receive case, the first local oscillator 35, the second local oscillator 55, the first mixers 30 and the second mixers 50 are used to downconvert the plurality of receive signals incident upon the antenna elements 80*a* and the plurality of receive signal paths will ultimately supply a plurality of digital IF signals to the digital signal processor 15 (or to a separate receive digital signal processor, not shown). The transmit and receive ones of the first local oscillator 35 and the second local oscillators 55 may, however, operate on different frequencies from one another, for example where a frequency split occurs between the transmit and receive bands in a duplex system. The first dispersion elements 37 or 38 and the second dispersion elements 57 or 58 may also be used in the plurality of receive paths or the plurality of local oscillator signal paths (or both) in the same manner and for the same purpose as was described above for the transmit aspects of the invention.

While various embodiments of the present invention have been described above, it should be understood that they have been presented by way of example, and not limitation. It will be apparent to persons skilled in the relevant arts that various changes in form and detail can be made therein without departing from the scope of the invention. In addition to using hardware (e.g., within or coupled to a central processing unit ("CPU"), micro processor, micro controller, digital signal processor, processor core, system on chip ("SOC") or any other device), implementations may also be embodied in software (e.g. computer readable code, program code, and/or instructions disposed in any form, such as source, object or machine language) disposed for example in a computer useable (e.g. readable) medium configured to store the software. Such software can enable, for example, the function, fabrication, modelling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known computer useable medium such as semiconductor, magnetic disc, or optical disc (e.g., CD-ROM, DVD-ROM, etc.). The software can also be disposed as a computer data signal embodied in a computer useable (e.g. readable) transmission medium (e.g., carrier wave or any other medium including digital, optical, analogue-based medium). Embodiments of the present invention may include methods of providing the apparatus described herein by providing software describing the apparatus and subsequently transmitting the software as a computer data signal over a communication network including the internet and intranets.

It is understood that the apparatus and method describe herein may be included in a semiconductor intellectual property core, such as a micro processor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. An active antenna array for a mobile communications network comprising:

a plurality of antenna elements for relaying radio signals at the plurality of antenna elements and being connected to a plurality of signal paths;

a plurality of signal inputs for inputting the radio signals at a first frequency band and being connected to the plurality of signal paths;

at least one first mixer in two or more of the plurality of signal paths for converting the radio signals between the first frequency band and a second frequency band;

a single first oscillator being connected to different ones of the at least one first mixer through a first oscillator signal path and supplying first oscillator signals to the at least one first mixer; and at least one first dispersion element connected to at least one of the plurality signal paths, wherein a setting of the at least one first dispersion element is dependent on at least one of a delay of the radio signals traversing the active antenna array or a length of the first oscillator signal path, wherein the at least one first dispersion element is connected in the first oscillator signal path between the single first oscillator and the at least one first mixer.

2. The active antenna array of claim 1, wherein the at least one dispersion element is connected within one of the plurality of signal paths.

3. The active antenna array of claim 1, further comprising a digital signal processor connected to the plurality of signal paths.

4. The active antenna array of claim 1, further comprising:

at least one second mixer in two or more of the plurality of signal paths; and a single second oscillator being connected to different ones of the at least one second mixer and supplying second oscillator signals to the at least one second mixer along a second oscillator signal path.

5. The active antenna array of claim 4, further comprising second dispersion elements connected between the single second oscillator and the at least one second mixer signal path.

6. The active antenna array of claim 4, wherein the second dispenser elements are at least one of a delay element or a phase-compensation element.

7. The active antenna array of claim 1, wherein the first dispersion elements are at least one of a delay element or a phase-compensation element.

8. The active antenna array of claim 1, further comprising at least one feedback path connected between an output of one of the plurality of signal paths and a calibration device.

9. The active antenna array of claim 8, wherein the calibration device is connected to a digital signal processor, the digital signal processor being connected to at least one of the plurality of signal paths.

10. The active antenna array of claim 8, further comprising a switching device in the at least one feedback path.

11. A method for frequency converting a plurality of radio signals comprising:

inputting the plurality of radio signals at a first frequency band;

generating a plurality of first oscillator signals from a single first oscillator converting the plurality of radio signals from the first frequency band to a second frequency band using first mixers supplied by the plurality of first oscillator signals; and adjusting the dispersion of at least one of the plurality of first oscillator signals or the plurality of radio signals based on at least one of a length of a first oscillator signal path between one of the first mixers and remainder ones of the first mixers or a delay of the radio signals traversing the active antenna array, with at least one first dispersion element connected in the first oscillator signal path between the single first oscillator and the at least one first mixer.

12. The method of claim 11, further comprising generating a plurality of second oscillator signals from a single second clock signal;

converting the plurality of radio signals from the first frequency band to an intermediate frequency band using the plurality of second oscillator signals; and converting the plurality of radio signals from the intermediate band to the second frequency band using the plurality of first oscillator signals.

13. The method of claim 12, wherein the adjustment of the dispersion comprises at least one of adjusting the phase or the timing of at least one of the second oscillator signals.

14. The method of claim 11, wherein the adjusting of the dispersion comprises at least one of adjusting the phase or the timing of at least one of the first oscillator signals.

15. The method of claim 11, further comprising adjusting the dispersion of the plurality of radio signals at the first frequency band.

16. The method of claim 11, further comprising generating a plurality of feedback signals for adjusting at least one of the plurality of radio signals.

17. A computer program product executable by a processor and embodied on a non-transitory computer readable medium, the computer-readable medium comprising control logic for the manufacture of an active antenna array comprising:

a plurality of antenna elements for relaying radio signals at a radio frequency, the plurality of antenna elements being connected to a plurality of signal paths;

a plurality of signal inputs for inputting radio signals and being connected to the plurality of signal paths;

at least one first mixer in two or more of the plurality of the signal paths for converting the radio signals from a first frequency to the second frequency;

a single first oscillator being connected to different ones of the at least one first mixer through a first oscillator signal path and supplying first oscillator signals to the at least one first mixer;

at least one dispersion element connected to at lest one of the plurality signal paths, wherein a setting of the at least one dispersion element is dependent on at least one of a length of the oscillator signal path or a delay of the radio signals traversing the active antenna array, wherein the at least one first dispersion element is connected in the first oscillator signal path between the single first oscillator and the at least one first mixer.

18. A computer program product executable by processor and comprising on a non-transitory computer readable medium having control logic stored therein for causing an active antenna array to execute instructions that enable a processor to carry out a method for relaying a plurality of radio signals, the control logic comprising:

first computer readable code means for inputting the plurality of radio signals at a first frequency band;

second computer readable code means for generating a plurality of first oscillator signals from a single first oscillator;

third computer readable code means for converting the plurality of radio signals from the first frequency band to a second frequency band using a first mixers supplied by the plurality of first oscillator signals; and fourth computer readable code means for adjusting the dispersion of at least one of the plurality of first oscillator signals or the plurality of radio signals based on at least one of a length of a first oscillator signal path between one of the first mixers and the remainder of the first mixers or a delay of the radio signals traversing the active antenna array, with at least one first dispersion element connected in the first oscillator signal path between the single first oscillator and the at least one first mixer.

19. A chip set comprising:

a plurality of signal inputs for inputting radio signals and being connected to the plurality of signal paths;

at least one first mixer in two or more of the plurality of the signal paths for converting the radio signals from a first frequency band to a second frequency band;

a single first oscillator being connected to different ones of the at least one first mixer through a first oscillator signal path and supplying first oscillator signals to the at least one first mixer; and at least one dispersion element connected to at lest one of the plurality signal paths, wherein a setting of the at least one dispersion is dependent on at least one of a length of the oscillator signal path or a delay of the radio signals traversing the active antenna array, wherein the at least one first dispersion element is connected in the first oscillator signal path between the single first oscillator and the at least one first mixer.

* * * * *